May 5, 1964 J. W. CROWNOVER 3,132,326

FERROELECTRIC DATA STORAGE SYSTEM AND METHOD

Filed March 16, 1960 5 Sheets-Sheet 1

INVENTOR
JOSEPH W. CROWNOVER

Charles A. Weigel, Jr.

ATTORNEY

INVENTOR
JOSEPH W. CROWNOVER
BY Charles A. Weigel, Jr.
ATTORNEY

FERROELECTRIC DATA STORAGE SYSTEM AND METHOD

Filed March 16, 1960

5 Sheets-Sheet 3

INVENTOR.
JOSEPH W. CROWNOVER
BY Charles A. Weigel, Jr.
ATTORNEY

INVENTOR
JOSEPH W. CROWNOVER
BY Charles A. Weigel, Jr.
ATTORNEY

INVENTOR
JOSEPH W. CROWNOVER

BY Charles A. Weigel, Jr.

ATTORNEY

United States Patent Office 3,132,326
Patented May 5, 1964

3,132,326
FERROELECTRIC DATA STORAGE SYSTEM AND METHOD

Joseph W. Crownover, La Jolla, Calif., assignor, by mesne assignments, to Control Data Corporation, Minneapolis, Minn., a corporation of Minnesota Filed Mar. 16, 1960, Ser. No. 15,431
25 Claims. (Cl. 340—173.2)

This invention relates to the storage of information using ferroelectric materials and more particularly to a system and method for non-destructively storing and reading out information from ferroelectric storage elements. A preferred embodiment of this invention makes it possible to construct a system utilizing hitherto generally unusable and undesired types of ferroelectric materials.

In recent years, much work has been done with ferroelectric materials, such as barium titanate, in an effort to utilize such materials in memory or storage applications. Some of the prior work done toward using ferroelectric materials for storage or memory applications is described, for example, in WADC Technical Report 55 339 entitled "Determining the Usefulness of Barium Titanate Material for Memory Devices in Large Scale Digital Computers," by C. F. Pulvari which is available from the Office of Technical Services. Other work that has been done with ferroelectric materials in memory applications is described in U.S. Patents Nos. 2,717,372 and 2,717,373 both issued September 6, 1955 to J. R. Anderson.

There is apparently no one complete theory encompassing all of the observed effects of ferroelectrics. However, the crystal structure and the domain mechanics of a ferroelectric material have been plotted as by X-ray diffraction techniques. By such methods, it appears that ferroelectric materials possess a polar axis which is the result of a small spontaneous ionic displacement. This ionic displacement spans the structure bidirectionally by approximately 1% perpendicular to a given plane, with respect to the remaining orthogonal planes. The bidirectional ionic displacement capabilities in a given direction constitute the essential mechanism of charge for memory or storage applications.

As is typically described in the above cited patents and reports, as well as in many other articles, due to this ionic displacement, which results when a ferroelectric material is subjected to an electric field, the material exhibits a relationship between the electric field intensity and its polarization direction (parallel to the electric field) which is in the general form of the hysteresis loop exhibited by ferromagnetic materials. By utilizing such ferroelectric material as the dielectric of a condenser, where each such condenser constitutes a separate memory element, this hysteresis effect can be used for the storage of information. These memory elements may be fully independent structures or may use a common dielectric having independent electrode pairs to constitute a plurality of memory elements electrically independent of each other.

In accordance with typical prior art techniques, a suitable ferroelectric material may be polarized in one direction to represent a binary "one" and in the reverse direction to represent a binary "zero." By direction of polarization is meant that phenomenon whereby certain crystals may exhibit a spontaneous dipole moment due to a polarization catastrophe, in which the local electric fields due to the polarization itself appear to increase faster than the elastic restoring forces on the ions in the crystal. This leads to an asymmetrical shift in ionic positions, and hence to a permanent dipole moment. The stored information is sensed, or read out, by applying a sensing voltage across the ferroelectric material to polarize it in a predetermined direction. The magnitude of the current pulse that passes through the ferroelectric material upon the application of the sensing voltage depends upon the previous polarization of the ferroelectric material. This type of read out, or sensing, wherein the polarization of the material may be actually reversed during such sensing is known as destructive read out or sensing. After such destructive read out, the stored information must be regenerated or restored to the selected memory element.

Unfortunately, such destructive read out gives rise to some rather difficult problems. For example, a ferroelectric material tends to lose its ability to be polarized after its polarization has been reversed (or switched) a finite number of times. When the material can no longer be polarized, its value as a memory element is reduced or even lost.

Another deficiency found in ferroelectric material is known as the accumulation effect. The accumulation effect is particularly troublesome in coincident voltage type memory matrices since half voltage pulses are applied along common row and column electrodes. These half voltage pulses, while acting to switch the selected memory element lying at the intersection of the two common electrodes, also act as disturbing pulses to the other memory elements lying along the respective common electrodes. There is apparently no minimum electric polarizing field for most ferroelectric materials below which a reversal of polarization cannot take place. That is, the application of these fractional disturbing pulses has been found to be cumulative such that a finite number of fractional pulses will eventually switch the best of the presently known ferroelectric materials.

Various systems have been devised in an effort to overcome this accumulation effect. Some such systems have used multiple condensers; others isolating diodes. While many of these prior systems have differed greatly, most have been notable by their relatively high cost and relatively great complexity.

Accordingly, it is an object of this invention to use ferroelectric materials in information storage applications without the attendant disadvantages of the prior art.

It is another object of this invention to nondestructively sense information stored in a ferroelectric memory element.

It is another object of this invention to provide a novel method to non-destructively sense and discriminate between different polarizations of a ferroelectric material.

In one specific illustrative embodiment of this invention, use is made of a ferroelectric material having what may be termed a "differential capacitance," i.e., one that varies with the polarity of the applied polarizing voltage. Using a slab or a wafer of this material, a ferroelectric storage matrix is formed by placing a number of common electrodes extending in parallel on one face and a number of common electrodes extending in parallel on the other face of the wafer at an angle to the first group of electrodes. An information address identifying the particular address location or occurrence in the system in which information has been stored is applied to a pair of address selectors. These address selectors, in turn, apply a fractional sensing voltage across a selected spatial memory element that is of insufficient magnitude to switch or reverse the direction of polarization of that memory element.

Using such a technique, the selected memory element may be non-destructively sensed, or read out, by observing the current that flows through the selected memory element during the application of the sensing pulse. Depending upon the direction of polarization of the memory element, the current flow will be greater than or less than a predetermined value. The different value currents result from the fact that the capacitance of the ferroelectric material employed differs, depending upon the direction of polarization thereof, due to its differential capacitance characteristic.

By applying these relatively small sensing pulses across the ferroelectric material, relatively few crystal domains are switched during sensing such that the ferroelectric material may be used for a longer period of time without losing its capability of polarization.

To achieve a ferroelectric memory that is very reliable, suitable control means are associated with each of the address selectors such that during each non-destructive sensing cycle of the memory, equal but opposite polarity pulses are applied to all of the memory elements lying on the selected row and column electrodes. By this technique, the cumulative effect of ferroelectric materials is reduced. More specifically, the equal but opposite polarity pulses during each memory cycle, tends to fully regenerate those disturbed memory elements such that they remain in their previous state of remanent polarization. This full regeneration is possible even though the sensing pulses are of insufficient amplitude to switch the polarization of the ferroelectric material, since use is made of the differential capacitance characteristic of the ferroelectric material employed. Using material having such characteristic, the pulse, or pulses, in each memory cycle which create an electric field in a direction of existing polarization of the ferroelectric memory element cause a greater voltage drop across the element than do opposite polarity pulses. More specifically, those disturbing pulses that are in the direction of existing polarization "see" a lower capacitance and therefore, due to the otherwise fixed impedance of the pulsing circuitry, cause a higher potential drop across disturbed memory elements than do the opposite polarity pulses. Thus, with the extensive application of alternating polarity fractional amplitude disturbing pulses, the selected memory element receives more electrical energy of a polarity tending to drive it further toward the existing direction of polarization.

Further advantages and features of this invention will become apparent upon consideration of the following description read in conjunction with the drawings wherein.

Figure 1:
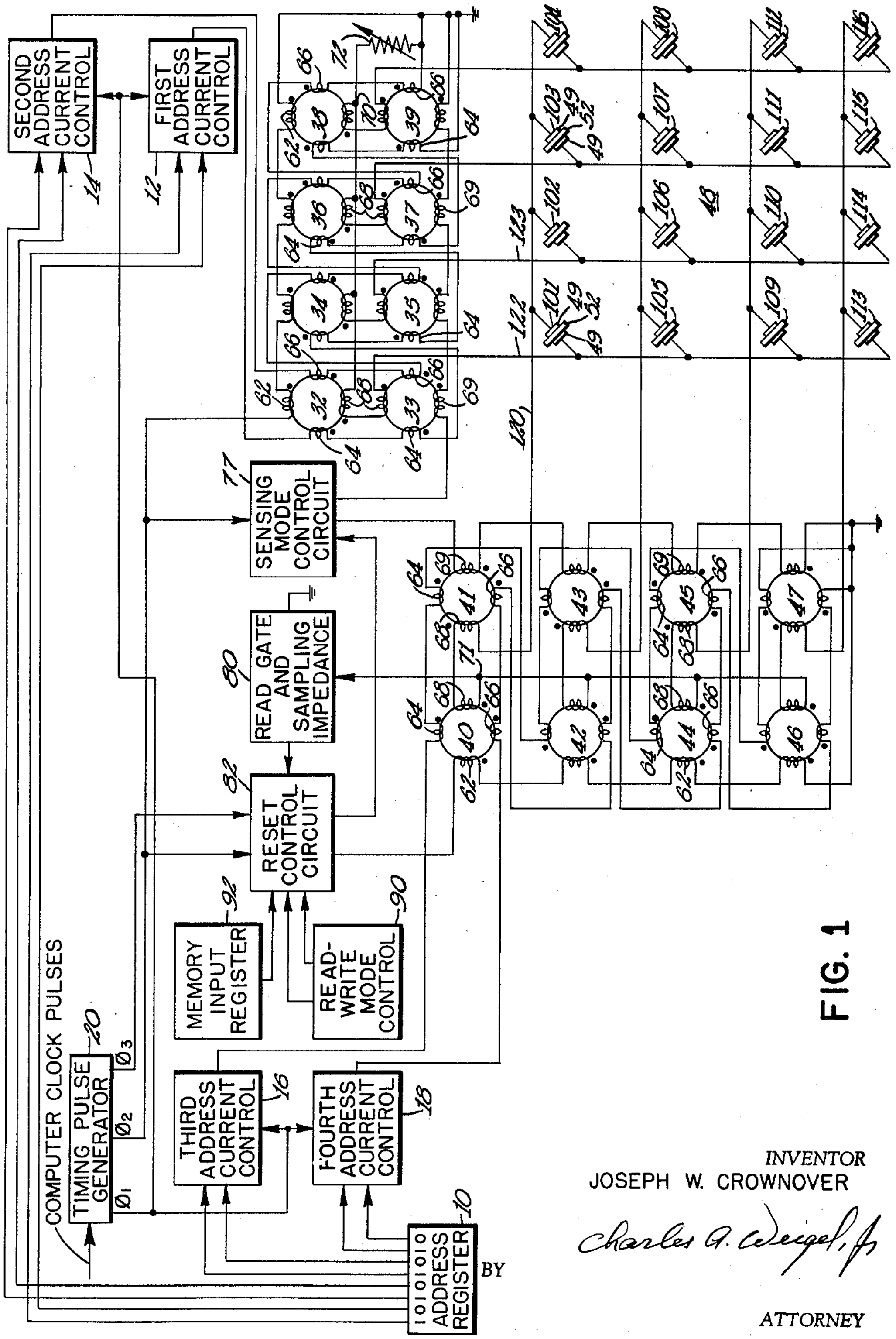
FIGURE 1 is a representative partly in schematic and partly in block diagram form of one specific illustrative embodiment of a system capable of achieving the non-destructive read out of this invention.

The method and system of one specific embodiment of this invention is described with the aid of the partial block and partial schematic diagram illustrated in FIG. 1. In order to provide a clear and complete understanding of the invention the method and system of this invention is set forth in the environment of a typical digital computing system. Thus, several of the registers, control flip-flops, etc. that are illustrated in FIG. 1 may be assumed to have inputs from this typical computing system. For example, the particular address or location in the memory system illustrated in FIG. 1 is stored in the form of binary or digital information in the form of an address code which may be derived from an address register 10. This address register, whose inputs are received from the computing system, may comprise a plurality of individual flip-flops each having "one" and "zero" outputs as represented by two separate and distinct voltage levels. For the sake of illustrating an integrated system, throughout the description of this invention a binary "one" is represented by a negative voltage level $-E$, for example, which may be $-10$ volts; similarly a binary "zero" is represented by a zero voltage level or ground. The several circuits and gates, etc. used herein, operate utilizing these voltage levels. It should be understood, however, that other suitable levels may be employed as desired in order to integrate the memory system of this invention into a typical digital computing system.

Figure 6:
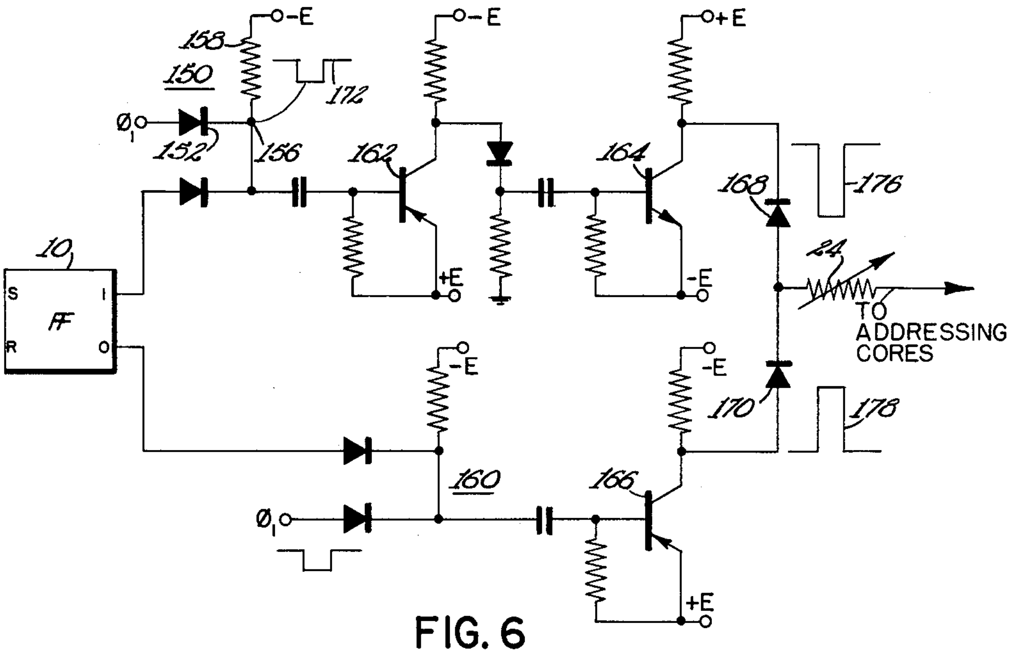
FIGURE 6 is a schematic diagram of an address current control circuit that may be employed in the system of FIGURE 1.

Thus, the address stored in the address register 10 may be in the form of a binary code such as is typically used in a digital computer. This address is applied to a first and second address selector, or column address-current-control- circuits 12 and 14, respectively, and to a third and fourth row address-current-control-circuit 16 and 18, respectively. The details of a suitable address-current-control-circuit that may be used in the system of this invention are illustrated in FIG. 6.

Each of the address-current-control-circuits 12 through 18 is actuated by the first one of a sequence of three timing pulses $\phi_1$, $\phi_2$ and $\phi_3$ which may be derived from a timing pulse generator 20. The timing pulse generator 20 may be triggered by a synchronizing clock pulse derived from the clock pulse of the digital computing system in which the memory of this invention may find use. Typically, the timing pulse generator 20 may be of the type described in U.S. Patent 2,860,243 issued to M. Kaplan on November 11, 1958. If the Kaplan timing pulse generator is employed, only the first three timing pulses $Tp_1$ through $Tp_3$, inclusive, would be needed.

Alternatively, the three sequential timing pulses $\phi_1$ through $\phi_3$ may be derived from a binary counter which operates to count the output clock pulses from the computer. Logic circuitry coupled to the output of each of the counter stages may be then used to select the three clock pulses $\phi_1$ through $\phi_3$ in response to the binary counts 0, 2, 4, etc. in a modulo 8 counter, for example.

Figure 4:
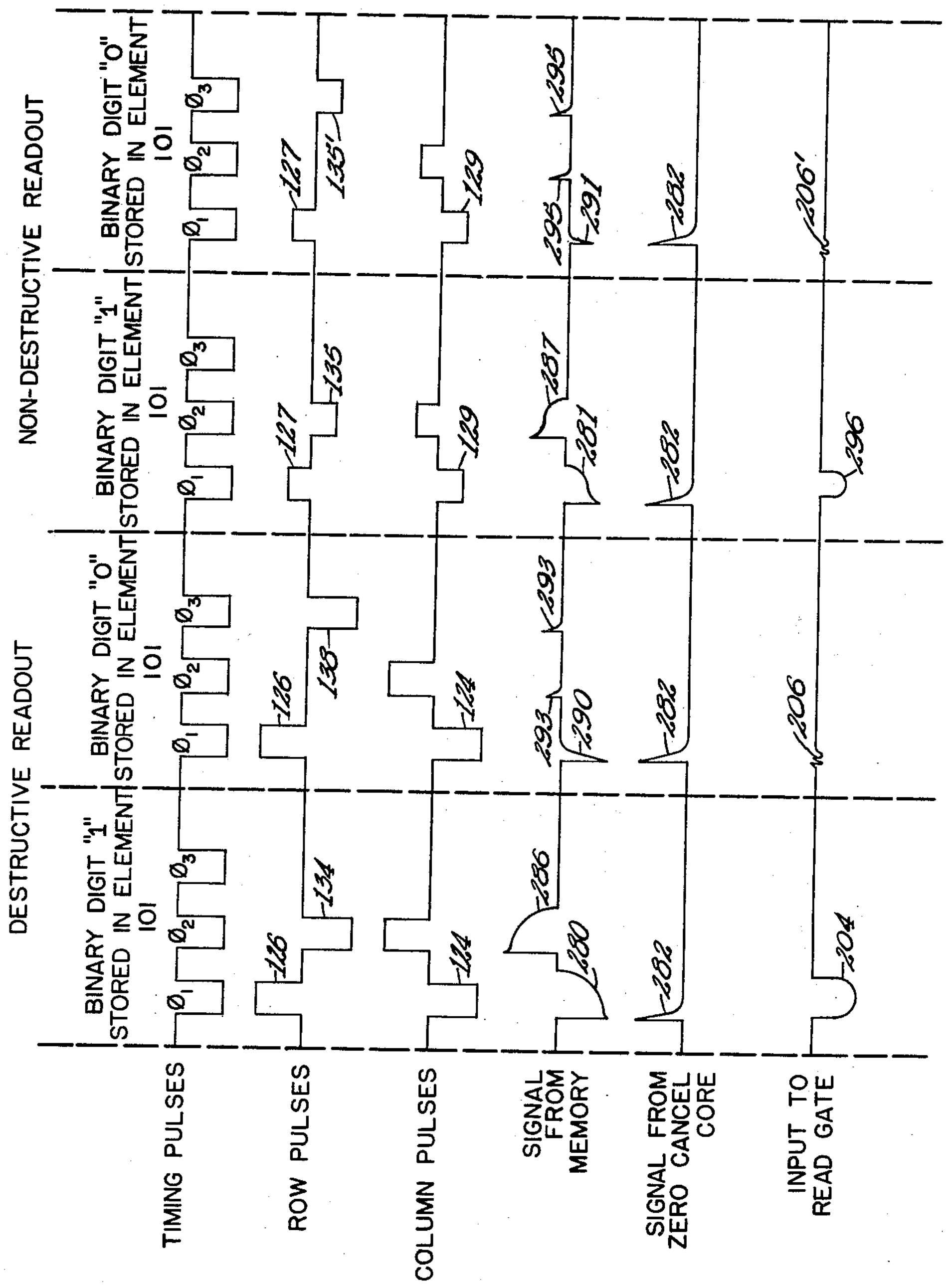
FIGURE 4 illustrates the waveforms of several of the pulses, the ordinate, plotted against time, the abscissa, which occur during both destructive as well as non-destructive sensing in the system of FIGURE 1.

In this manner, the three timing pulses $\phi_1$ through $\phi_3$, inclusive, appear sequentially at accurately spaced intervals as is illustrated, for example, in the waveforms of FIG. 4. As is described in detail, in conjunction with FIG. 6, the address-current-control circuits are gated by each of the first timing pulses $\phi_1$ to provide an output pulse having a polarity that is dependent upon the address input from the address register 10. For the system illustrated in FIG. 1, the address-current-control circuits, 12 through 18, each provide a negative going pulse in the event its address input is a signal representing a binary "one" and a positive going pulse in the event its address input is a signal representing a binary "zero." The output of each of the address-current-control circuits 12 through 18, is coupled through a variable resistor. For reliability the address-current-control circuits 12 through 18 provide pulses of more than sufficient amplitude which are then attenuated by the variable resistor to provide the proper amplitude pulse to drive the several cores as will be described below.

The first and second column address-current-control circuits 12 and 14, respectively, are coupled to each core of four pairs of column addressing cores 32 through 39, inclusive. In similar manner, the third and fourth row address-current-control circuits 16 and 18, respectively, are coupled to each core of four pairs of row addressing cores 40 through 47, inclusive. Each pair of row and column addressing cores 32 to 42 inclusive are coupled to apply pulses of a designated polarity and amplitude to these common electrodes of a ferroelectric coincident type storage matrix 48 in accordance with the address held by the address register 10.

Figure 2:
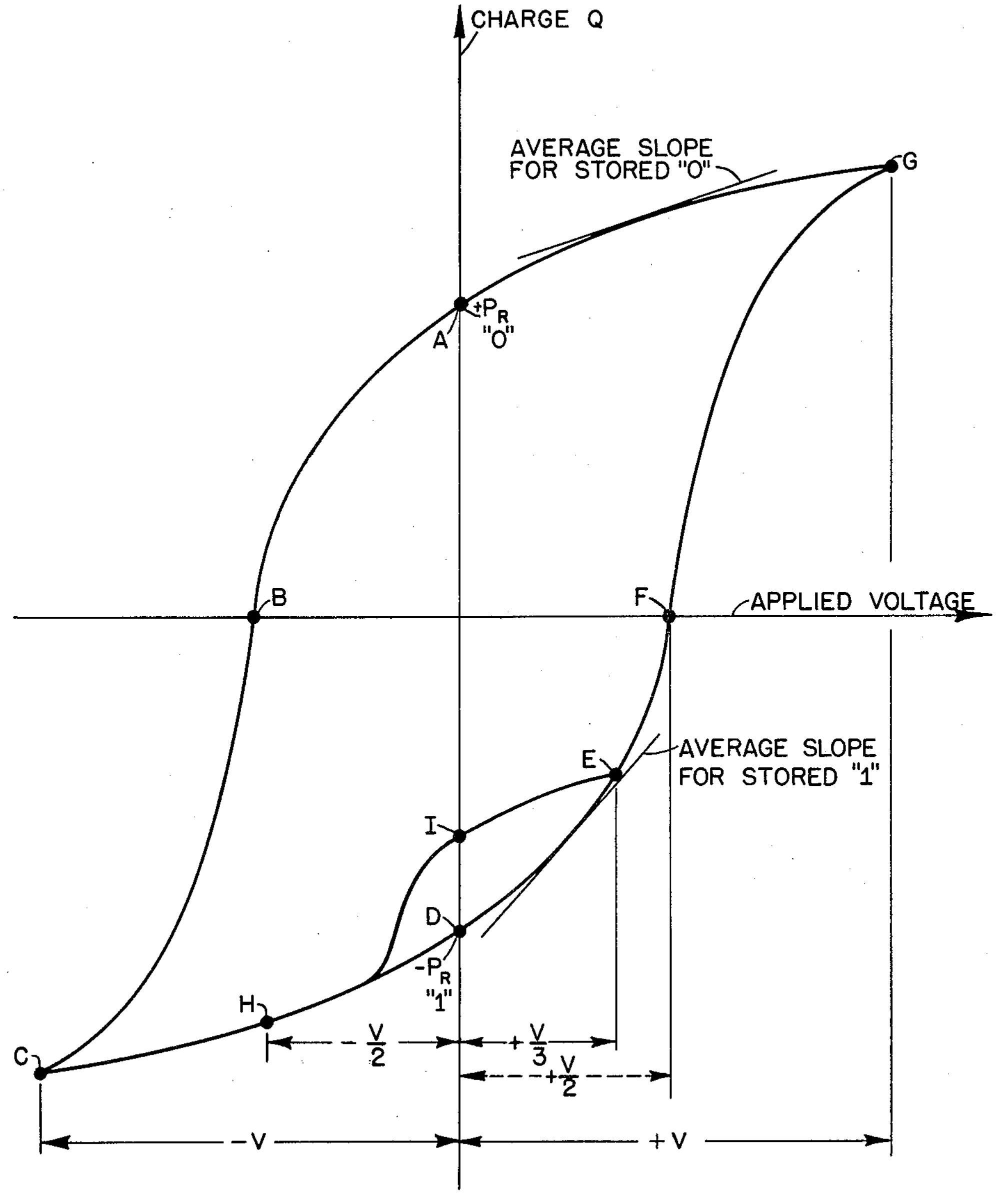
FIGURE 2 is a graphical illustration of a typical hysteresis exhibited by the ferroelectric material that desirably may be used with this invention in which the charge acquired by the ferroelectric dielectric is plotted as the ordinate as a function of coercive voltage applied across the dielectric (as the abscissa)
Figure 3:
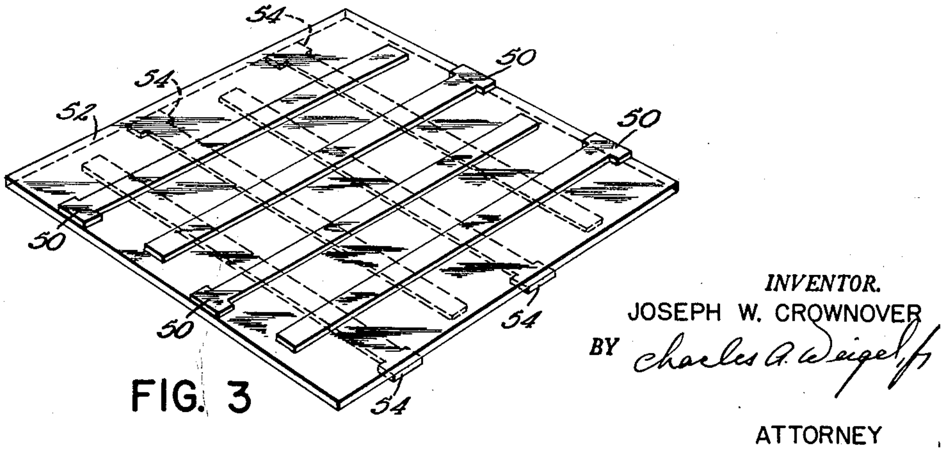
FIGURE 3 is a perspective view of a ferroelectric storage matrix that may be employed in the specific embodiment of the invention set forth in FIGURE 1.

The ferroelectric storage matrix 48 may advantageously be of the type illustrated in FIG. 3 wherein a parallel array of electrodes 50 is placed on one face of a slab, wafer, film, or surface of ferroelectric material 52. To achieve the non-destructive read out feature in accordance with this invention, the ferroelectric material should be of a polycrystalline type such as may be provided by a crystal formed from the combination of 58% lead zirconate and 42% lead titanate. Such types of ferroelectric materials exhibit a hysteresis characteristic that has a differential capacitance, or slope, on either side of the points of zero applied voltage. The details of such material will be described hereinafter with reference to FIG. 2. In general, any type of ferroelectric material may be used to form the slab, wafer, film or surface 52 provided such ferroelectric material exhibits a hysteresis characteristic having the differential capacitance effect described. For ease of description, this type of ferroelectric material will be referred to and claimed as having a differential capacitance.

A second parallel array of electrodes 54 is placed on the opposite face of the wafer 52. These two arrays of electrodes 50 and 54 may be perpendicular, or at some other angle with respect to each other, such that the several common electrodes on one face intersect each of the several common electrodes of the other face. In this manner, each spatial intersection of the electrodes forms a ferroelectric condenser, or memory element. Typically, the ferroelectric material may be in the order of .005" to .001" thick.

In the specific illustrative embodiment of this invention that is being described, the storage matrix provides storage for 16 individual bits of information, each parallel array comprising four common electrodes. It should be apparent to those skilled in the art that a much larger number of common electrodes may be placed on the ferroelectric wafer 52 to obtain a greater number of ferroelectric elements. If such larger number of common electrodes were employed, it would, of course, be necessary to provide additional addressing cores.

As is known, in order to store information in any of the ferroelectric memory elements formed by the dimensional coincident type matrix of FIG. 3, a voltage V is applied across these electrodes that intersect at that selected storage memory element. This is accomplished in a known manner by simultaneously applying a fractional voltage of one polarity and having a magnitude ½V, for example, to the top electrode and a fractional voltage of the opposite polarity but of the same magnitude ½V to the bottom electrode. Next, to read out destructively the information from this selected memory element in the matrix, a single sensing or read pulse of the same amplitude but a predetermined, or opposite polarity, namely —V volts, is applied to the electrodes of that selected memory element. As occurred during the storage cycle the negative voltage pulse —V may be generated by the use of fractional or half voltage pulses applied to each of the selected common electrodes. This mode of storing the information in the memory elements and sensing such memory elements is known as the destructive mode of operation since, during sensing, the selected memory element may be driven to the opposite polarization thereby destroying the stored information.

To facilitate the description of this invention, the bottom common electrodes 52 of the storage matrix 48 of FIG. 3 may be considered as individually coupled to a different one of each of the pairs of column addressing cores 32 through 39 and will be referred to as a column. Further, the memory elements formed by such common electrode will be referred to as a column of memory elements. Also, the common electrodes 50 appearing on the top face of the ferroelectric material 52 may be considered as individually coupled to a different one of each of the pairs of row addressing cores 40 to 47, inclusive. These common electrodes 50 will be referred to as row electrodes and the momery elements formed thereby as a row of memory elements. The individual memory elements that are formed at the spatial intersection of each of the row and column electrodes 50 and 52, respectively, are illustrated as individual ferroelectric condensers or memory elements 101 to 116, inclusive, in FIG. 1. Thus, one of the ferroelectric elements 113 is illustrated as having a ferroelectric wafer 52 sandwiched between plates 49.

Returning now to FIG. 1 each of the row and column addressing cores 32 to 47, inclusive, may be made of permalloy (78% nickel and iron) or a similar material such as tape wound cores or cores made of a magnetic film, the only requirement being that the material used have a magnetization hysteresis characteristic that is substantially rectangular. Thus, each of the addressing cores 32 through 47, inclusive, is provided with a first half-read-winding 64, a second half-read-winding 66 and a drive or output winding 68. The first cores 32, 34, 36, 38, 40, 42, 44 and 46 of each of the pairs of row and column addressing cores each are provided with a reset winding 62. In a similar manner, the second cores 33, 35, 37, 39, 41, 43, 45 and 47 of each of the pairs of column addressing cores are provided with a disabling winding 69. Note that each of the reset windings 62, the disabling winding 69, and the drive windings 68 are wound to have twice the number of turns on their respective cores as do the first and second half read windings 64, 66, respectively. The precise number of turns comprising each winding will, of course, depend on the type and thickness as well as the amplitude of the exciting pulses that are applied to the addressing cores.

The dots placed at either end of the winding on the cores are used in the conventional manner to indicate instantaneous potentials having the same polarities. Thus, if the current flows through one winding so that its dot end is positive with respect to the non-dot end, the field set up in the core associated with that winding induces voltages in the other windings mounted on that same core making their dot end positive going with respect to their non-dot end at the same time.

Each of the column addressing cores' reset windings 62 (hereinafter referred to as the column reset windings) is connected in series with each other between a point of reference potential, that is ground, and the source of timing pulse generator 20 such to receive the second timing pulse $\phi_2$. To conform to the switching logic for the addressing cores that is illustrated in FIG. 1, the timing pulses $\phi_1$ through $\phi_3$ are assumed to be negative going as is illustrated in FIG. 4. In a similar manner, each of the column first-half-read windings 64 is connected in series between the first address-current-control circuit 12 and ground so as to be energized thereby. Each of the column second-half-read windings is connected in series with each other between ground and the output of the second address-current-control circuit 14 so as to be energized thereby. The two column drive windings 68, one for each core of each of the core pairs, are connected in series with each other between a different one of the column electrodes 54 and a common point 70. The common point 70 in turn is coupled through a variable balancing resistor 72 to ground. Thus, each of the column electrodes is driven by a different pair of column addressing cores. Similarly, each of the column disabling windings 69 is connected in series between a sensing-mode-control circuit 77 and ground.

The details of the sensing-mode-control circuit 77 will be described more fully in conjunction with FIG. 8. Suffice it to say for the present that the function of the sensing-mode-control circuit 77 is to allow the second one of each pair of column and row addressing cores 33 to 47 inclusive (odd numbers only) to operate simultaneously with the first one of each pair of column and row addressing cores 32 to 46, inclusive (even numbers only) or to disable the first core of each pair.

Each of the row addressing cores 40 through 47, inclusive, also has a first-half-read winding 64, a second-half-read winding 66 and a drive, or output, winding 68. Further, the first cores 40, 42, 44 and 46, of each pair of row addressing cores each have a reset winding 62. In like manner, the second cores 41, 43, 45 and 47 of each pair of row addressing cores have a disabling winding 69. Since these windings are essentially the same as those described above in connection with the column addressing cores, the same reference numerals have been applied. Thus, each of the row first-half-read windings 64 is coupied in series with each other between the third address control circuit 16 and ground. Likewise, each of the row second-half-read windings 66 is connected in series with each other between the fourth address-current-control circuit 18 and ground. Also, the drive windings 68 of each pair of row addressing cores 40 to 47, inclusive, are connected in series with each other between a different row common electrode and a common point 71. In turn, the common point 71 is connected to the input of a read gate and sampling impedance illustrated by the block 80.

Figure 5:
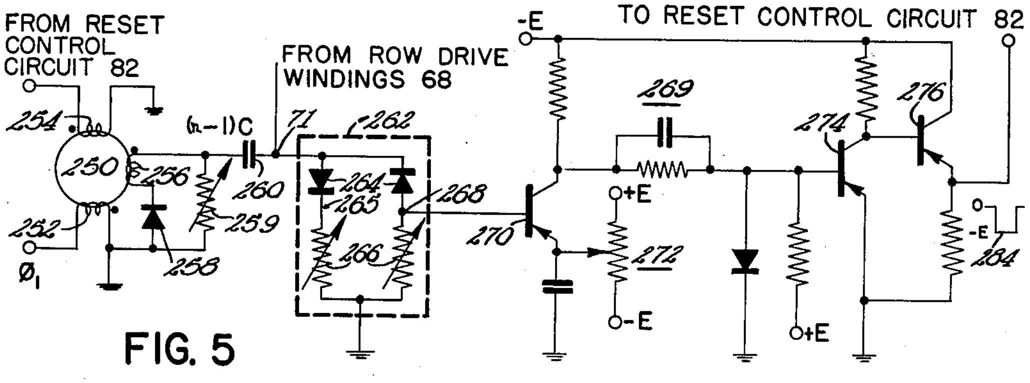
FIGURE 5 is a schematic diagram of a read gate and sampling impedance that may be employed in the system of FIGURE 1.

The details of the read gate and sampling impedance 80 are set forth in detail in conjunction with FIG. 5. Simply stated, the read gate and sampling impedance 80 provides a low impedance path to ground for each of the pairs of row drive windings 68. Note that the row drive windings 68 are wound oppositely to those of the column drive windings 68 with respect to the remaining windings on each core (as designated by the dot symbols). This arrangement provides fractional pulses that are of opposite polarity to the fractional pulses provided by the several column addressing cores. The two opposite polarity pulses together make up the required switching voltage across the selected memory element.

Each of the row reset windings 62 is connected in series with each other to be driven by what is termed a reset control circuit 82. The details of the reset control circuit 82 are illustrated and described in conjunction with FIG. 7 hereinafter. For the present, it is sufficient to say that the reset control circuit 82 senses the output of the read gate and sampling impedance 80 and, as a result of this sensing, passes either the second or the third timing pulse $\phi_2$ or $\phi_3$, respectively, through the row reset windings 62. It is by this reset control circuit 82 that the binary "one" or the binary "zero" is regenerated in the particular selected ferroelectric memory element. The reset control circuit 82 also functions to insert new information into the ferroelectric memory. Thus, a read-write mode control circuit 90 provides inputs to the reset control circuit 82. Also, a memory input register 92, which holds the binary information to be stored, provides an input to the reset control circuit 82. Both the memory input register 92 and the read-write mode control circuit 90 may form part of a typical computing system.

The sensing-mode-control circuit 77 is connected to receive the second timing pulse $\phi_2$ and an input from the reset control circuit 82. The row and column disabling windings 69 each are connected in series with each other between ground and the output of the sensing-mode-control circuit 77.

To facilitate the description of this invention, it will be assumed that each of the addressing cores 32 through 47, inclusive, is driven toward what may be designated as negative saturation when energized by current flowing through one of the four windings mounted on each core in a direction such that the dot end is positive going with respect to the non-dot end. Conversely, if the winding is energized by the current flowing such that the dot end is negative going with respect to the non-dot end, the particular core is driven in the opposite direction toward what may be designated as positive saturation. Note that, due to the smaller number of turns on the half-read windings for a particular core 64 and 66, both must be energized in the same direction to change the state of saturation of the core. For example, if the particular core was in a condition of negative saturation the core will remain in this condition in accordance with well known magnetic switching techniques. If, however, both of the half-read windings 64 and 66 for the same core are energized by the same current, and the field established by each of the windings is the same direction, the combined effect is sufficient to change the state of saturation of the core. In this manner, by winding the two half-read windings in different directions about each of the pairs of row and pairs of column-addressing cores, a single row or column electrode may be energized selectively.

Before describing the details of the addressing operation, however, it is believed necessary to describe the operation of the ferroelectric memory matrix 48. This operation is best described in connection with the hysteresis loop of FIG. 2 which represents the charge characteristics of a typical one of the memory elements 101 to 116, inclusive, in the ferroelectric memory matrix 48. As noted, these memory elements are illustrated as individual condensers 101 to 116, inclusive, each having a pair of plates 49 with a dielectric 52 placed therebetween.

The hysteresis loop illustrated in FIG. 2 comprises a plot of the relation that exists between the coercive voltage V that is applied across the electrodes of a ferroelectric memory element and the resulting charge Q which is acquired by that element. This hysteresis loop illustrates a somewhat idealized hysteresis characteristic that may be most advantageously employed to achieve the non-destructive readout in accordance with the method and system of this invention. The principal characteristic of this material is that of having what has been termed a "differential capacitance," i.e., a capacitance that varies depending on the polarity of the applied voltage V.

In the hysteresis loop of FIG. 2 the ordinate represents the internal charge Q acquired by the ferroelectric material lying between any of the spatial intersections of the row and column electrodes 50 and 54 (FIG. 3), for example, or that acquired by the ferroelectric material 52 lying between the condenser plates 49 as illustrated in FIG. 1. The charge Q is equal to the internal polarization P in the direction of the applied electric field E per unit area A of the electrodes for the particular ferroelectric element.

The abscissa of the hysteresis loop represents the coercive voltage V existing across a particular ferroelectric memory element. This coercive voltage V is equal to the product of the applied electric field strength E and the crystal thickness T. The capacitance C of the ferroelectric element 52, for example, is defined as the ratio of change of polarization per unit volume to the change in the applied field. Thus, if $$Q=\frac{P}{A} \text{ and } V=ET, \frac{dQ}{dV}=\frac{1}{AT}\frac{dP}{dE}$$

It is obvious from FIG. 2 that this ratio, and thus the capacitance of the ferroelectric material, is different on either side of the points of zero applied voltage. It is this difference termed "differential capacitance," as will be described hereinafter that forms the basis for the non-destructive read out feature of this invention. Actually, the shape of the hysteresis characteristic may be defined as being substantially non-rectangular.

The first time a voltage is applied across one of the ferroelectric memory elements 101 to 116, inclusive, of FIG. 1, before it is polarized, the existing charge acquired by the ferroelectric material may be zero; hence, the hysteresis loop, which exhibits this charge — voltage relationship, may start at the origin of the ordinate and abscissa in FIG. 2. However, thereafter, the typical hysteresis loop that is illustrated in FIG. 2 defines the charge — voltage relationship. The application of an applied voltage ±V, switches the polarization of the ferroelectric memory element to one or the other of its stable states. These stable states are known as the points of remanent polarization because the ferroelectric material retains a certain amount of its polarization even after the removal of the electric polarizing field. By arbitrarily defining one of these stable states of remanent polarization as representing a binary "zero" and the other stable state of remanent polarization as representing a binary "one," the ferroelectric memory elements may be made to store digital information. Thus, the point of positive remanent polarization $+P_r$, as represented by the point A on the hysteresis loop of FIG. 2, may be said to represent a binary "zero," whereas the point of negative remanent polarization $-P_r$, which is illustrated by the point D on the hysteresis loop, may be said to represent a binary "one."

If a ferroelectric memory element, for example, the first memory element 101 (FIG. 1), is in a state of positive remanent polarization $P_r$, with the application and removal of a negative electric field across the ferroelectric memory element, such as is created by the application of a negative switching voltage, illustrated as −V in FIG. 2, the charge condition of the ferroelectric memory element changes in the manner illustrated by the path on the hysteresis loop moving from the point A downward and to the left following the switching path BCD to the point D which represents the remanent condition of negative polarization $-P_r$.

Now, with the application of a positive electric field across this memory element, such as by the application of a positive saturating, or switching voltage, +V, its charge state changes in the manner illustrated by the hysteresis loop of FIG. 2. With the application of the positive saturating voltage +V, the switching path moves from point D to the right and up through point F to the point G which represents the point of positive polarization saturation. Upon the removal of the applied saturating voltage +V, the state of the ferroelectric element changes, is represented by the path in FIG. 2 moving downward and to the left to the point of positive remanent saturation $P_r$, denoted by the point A which represents a binary "zero."

As is described, in a co-pending application filed concurrently herewith by Messrs. Crownover, Williams, and Waddell and assigned to the same assignee as the subject invention, information may be read out destructively from any ferroelectric memory element by application of a sensing, or read out, voltage having the same amplitude and polarity as the positive (or negative) saturating voltage ±V such that the ferroelectric element is driven to positive (or negative) remanent polarization $\pm P_r$. Since $I=dQ/dT$ the change in charge occurring, the application of this sensing voltage, or pulse, can be observed by examining the flow of current that takes place through the selected memory element by way of a series impedance. In describing this invention, a positive sensing voltage will be used.

If a binary "one" has been stored so that the ferroelectric memory element is in a condition of negative remanent polarization, indicated by the point D on the hysteresis loop of FIG. 2, the sensing pulse causes the ferroelectric material to operate in a high capacitance region, i.e., as is illustrated in FIG. 2 by the path DEFGA. Since the hysteresis loop characterizing the charge — voltage relationship in this region is observed as being relatively steep, the capacitance of the ferroelectric element is relatively high. On the other hand, if a binary "zero" had been stored, with the application of the positive sensing voltage +V the ferroelectric element changes its polarization, and thus charge, in a manner illustrated in the hysteresis loop of FIG. 2 by the path AGA. Note that in this region of operation, the slope of the hysteresis loop and thus the capacitance of the ferroelectric element, is relatively small.

It will thus be observed that a relatively large read out pulse develops across the sensing impedance when a binary "one" has been stored whereas a relatively small read out pulse results when a binary "zero" has been stored. It is also known that in ferroelectric data storage systems wherein a number of ferroelectric memory elements are connected in a storage matrix having common electrodes such as illustrated in FIG. 3, the required switching voltage ±V is attained by applying a fractional switching voltage such as ±½V to one row electrode and a partial switching such as ±½V to one column of electrodes, whereby the full switching voltage ±V is applied only across the selected memory element lying at the intersection of the selected row and column electrodes.

Thus, to sense destructively the first ferroelectric memory element 101, a positive half voltage pulse illustrated by the waveform 126 (FIG. 4), of +½V amplitude is applied along the upper common row electrode 120 (FIG. 1) and a similar negative going pulse illustrated by the waveform 124 (FIG. 4) of amplitude −½V is simultaneously placed on the first column electrode 122. The selected ferroelectric memory element 101 appearing at the spatial intersection of these two electrodes 120 and 122 is thereby driven in the positive direction of polarization. During such sensing by the destructive read out method, each of the remaining ferroelectric elements 102, 103 and 104 which are associated with the first row common electrode 120 are disturbed by the same sensing pulses 124 and 126 (FIG. 4).

While, as can be seen from the hysteresis loop of FIG. 2, this fractional disturbing voltage of +½V is by itself insufficient to cause all of the domain of the ferroelectric material to reverse their direction of polarization, a certain finite number of the domains do in fact reverse their direction of polarization. As is known, the repeated application of such disturbing voltages to a particular ferroelectric memory element, without an intervening voltage of opposite polarity being applied thereto, may cause a sufficient number of domains of the ferroelectric material to reverse their polarization such that the ferroelectric material erroneously may be polarized in the opposite direction.

Further, possibly switching each of the ferroelectric memory elements every time it is desired to sense destructively a particular element, has a deleterious effect upon the ferroelectric material. It is a characteristic of ferroelectric material that after repeatedly being switched from one direction of polarization to the other, over a period of time, its ability to be polarized is reduced and sometimes lost. When such ability to be polarized is reduced or lost, the material becomes virtually useless in memory applications.

In accordance with the method and system of this invention, these deficiencies and difficulties are overcome. A selected ferroelectric memory element having a differential capacitance dielectric, is sensed, or read out, non-destructively by (1) applying a predetermined polarity sensing pulse across the selected element of insufficient amplitude to reverse the direction of polarization of the dielectric, and (2) detecting the amplitude of current flowing through the selected memory element during the application of the sensing pulse.

Considering these steps in detail, the first element 101, for example, is sensed, or read, non-destructively, by applying relatively small fractional voltage sensing pulses to the selected row and column electrodes 120 and 122. The amplitude of these non-destructive sensing pulses is such that the total applied voltage across the ferroelectric memory element 101 is less than that which reverses the direction of polarization of the ferroelectric material 52. Typically, these row and column fractional sensing pulses are quarter amplitude V/4 pulses. These row and column non-destructive pulses are illustrated in FIG. 4 by the waveforms 127 and 129, respectively.

As may be observed from the average slopes of the hysteresis loop of FIG. 2, the selected memory element 101 exhibits a different capacitance depending upon whether a binary "one" or a binary "zero" is stored. This is due to the differential capacitance characteristic of the ferroelectric material employed. Thus, for the positive going sensing pulses the average capacitance of the selected memory element is storing a binary "zero" (as typified by the average slope of the hysteresis loop in this operating region) is less than its average capacitance when storing a binary "one." The term "average capacitance" is employed because the capacitance of the ferroelectric material changes deepnding on the polarizing voltage and the state of existing charge (or polarization), which relationship is illustrated by the hysteresis loop of FIG. 2. As a consequence, the current flow through the selected memory element 101 is larger for a stored binary "one" than for a stored binary "zero."

Unfortunately, during sensing, the remaining ferroelectric memory elements 102, 103, 104, 105, 109 and 113 which lie along the excited common row and column electrodes 120 and 122, respectively, may have been disturbed sufficiently to have caused some of the domains of the ferroelectric material 52 to reverse their polarization.

To prevent this domain reversal from becoming cumulative with succeeding sensing pulses, depending upon the sensed binary condition of the selected ferroelectric memory element 101, fractional amplitude opposite polarity reset pulses, illustrated by the waveforms 135 and 137 in FIG. 4, respectively, are applied either sequentially or simultaneously to the respective row and column electrodes 120 and 122. No more than one fractional amplitude disturbing pulse is applied to any one memory element without that element being regenerated by the application of equal but opposite polarity reset pulses.

Due to the fixed impedance of the sensing and reset pulse circuitry, and the differential capacitance characteristic of the ferroelectric material employed, the non-destructive sequential sensing and reset pulses, which are equal in amplitude but opposite in polarity, tend during the successive memory cycles to restore the selected memory element fully to its original direction of polarization. This is possible even though the sensing and reset pulses together are of insufficient amplitude to reverse the polarization of the selected memory elements. Note that the capacitance of the selected memory is less when excited by an electric field in the direction of the existing polarization, and conversely, is greater when excited in a direction opposite that of the existing direction of polarization (see FIG. 2). Because of the fixed impedance of the drive circuitry, these variations in capacitance result in a potential drop across the selected memory element 101 that is greater for pulses having a polarity which drive the selected memory element 101 in its existing direction of polarization.

The selected memory element, therefore, has more electrical energy applied to it of a polarity that tends to drive it toward the existing direction of polarization. Thus, whether the memory element is storing a binary "zero" or a binary "one," this condition is maintained during the successive memory cycles.

If, for example, the selected ferroelectric memory element 101 had contained a binary "one" and thus was at its stable state of negative remanent polarization, designated by the point $-P_r$ in the hysteresis loop of FIG. 2, upon the application of a half amplitude sensing pulse $V/2$, for example, the charge of the memory element 101 varies in accordance with the applied voltage. This relationship is illustrated in FIG. 2, i.e., the ferroelectric material leaves the state of negative remanent polarization, illustrated by the point D, and varies to a polarization state in the manner illustrated by the hysteresis loop moving to the right and up to the point E. It should be noted by the average slope of the hysteresis loop between the points D and E, that the capacitance presented by the memory element 101 to the sensing pulse $V/2$ is relatively large. Because of the fixed impedance of the core drive circuitry, the resulting voltage drop across the memory element is actually smaller than the half amplitude pulse $V/2$ and may be in the order of a one-third amplitude pulse $V/3$, as illustrated. It is for this reason that the half amplitude sensing pulse $V/2$ is capable only of changing the charge of the selected memory element 101 to the extent illustrated by the point E on the hysteresis loop. With cessation of the half voltage sensing pulse $V/2$, the negative charge stored by the selected memory element increases to a stable value represented on the hysteresis loop by the point I.

Note that relatively large average capacitance of the selected memory element 101 allows a commensurately large current flow during sensing, as is illustrated by the waveform 281 (FIG. 4). This output pulse 281 is detected by the read gate and sampling impedance 80 and passed to the reset control circuit 82.

During the reset cycle, the reset control circuit 82 controls the application of the reset pulses to the selected row and column electrodes 120 and 122. Thus, the selected ferroelectric memory element 101 is pulsed by a negative half amplitude polarizing voltage $-V/2$ (FIG. 2) which, as will be observed from the hysteresis loop, returns the selected memory element 101 to its original condition of negative residual polarization illustrated by the point D. Note that during this reset portion of the memory cycle, the selected memory element 101 is driven through a transitional region of relatively high capacitance (see the relatively steep slope of the hysteresis loop over a portion of this region of operation path IHD). The selected memory element quickly passes through the transitional high capacitance to a region of lower capacitance (that region along line HD in FIG. 2). Thus, even if a smaller actual reset voltage does occur, in transition, across the selected memory element 101, it is sufficient to place the element in the condition of maximum negative charge as represented by the line CHD in FIG. 2. Now, with the cessation of the reset voltage, the selected memory element returns to its remanent negative charge state, illustrated by the point D, and the binary "one" is retained. Due to the relatively high capacitance, during sensing, the selected element 101 passes a relatively large current pulse, as illustrated by the waveform 287 (FIG. 4).

If, on the other hand, the selected memory element 101 had originally been polarized in the positive direction, thereby to store a binary "zero," during the non-destructive sensing cycle, the selected memory element 101 is excited by a positive half voltage pulse $+V/2$ which tends to increase the polarization or charge of the ferroelectric material 52 in a positive direction to a slight extent as may be observed from the hysteresis loop of FIG. 2. Since the slope of the hysteresis loop over this portion (AG) of the operating cycle for a stored "zero" is less steep, the resulting output current which passes through the selected memory element 101 is commensurately small as illustrated by the waveform 291 of FIG. 4. This relatively small current pulse 291 is detected by the reset control 80 circuit as a binary "zero" which acts to delay the application of the row quarter voltage opposite polarity pulse to a time position illustrated by the waveform 135' (FIG. 4) so as not to coincide with the application of the column quarter voltage reset pulse 137. By thus varying the time sequence of the quarter amplitude reset pulses in the manner set forth in the said Crownover et al., application, the selected memory element 101 is subjected to only quarter amplitude reset pulses rather than the full one half amplitude reset pulses. As may be observed from the hysteresis loop of FIG. 2, the use of quarter amplitude pulses has far less tendency to change the polarization of the selected memory element than if the row and column pulses had occurred simultaneously to pulse a half amplitude applied voltage. The memory therefore is made far more reliable in operation.

A similar analysis may be made to demonstrate that the memory elements 102, 103, 104, 105, 109, and 113 lying along the selected row and column electrodes, are driven farther toward their existing direction of polarization by the sequential alternating polarity sensing and reset pulses. The basis for this type operation is the differential capacitance characteristic of the ferroelectric material employed.

It is thus apparent, that by the use of these non-destructive fractional pulses, even though the ferroelectric material may be sensed a large number of times, relatively few domains of the material have their polarization reversed during sensing. Because of this, the material may last for a longer time without losing its ability to be polarized as described herein.

Having thus described the method of this invention, a particularly desirable system for effecting this method using the pairs of row and column addressing cores 32 through 47, inclusive, for driving each one of the several row and the several column electrodes is now described.

Briefly, the address register 10 applies voltage levels representing a binary address to the first, second, third and fourth address current control circuits 12 to 18, inclusive, which, in turn, select a pair of row drive cores and a pair of column drive cores thereby to select a particular one of the ferroelectric memory elements 101 to 116, inclusive. The binary logic employed by the address register 10 is set forth in the following table:

| Binary Address to Current Control Circuits | | | | Cores Selected | | Memory Element Selected |
|---|---|---|---|---|---|---|
| 0 | 0 | 0 | 0 | 32, 33 | 40, 41 | 101 |
| 1 | 0 | 0 | 0 | 34, 35 | 40, 41 | 102 |
| 0 | 1 | 0 | 0 | 36, 37 | 40, 41 | 103 |
| 1 | 1 | 0 | 0 | 38, 39 | 40, 41 | 104 |
| 0 | 0 | 1 | 0 | 32, 33 | 42, 43 | 105 |
| 1 | 0 | 1 | 0 | 34, 35 | 42, 43 | 106 |
| 0 | 1 | 1 | 0 | 36, 37 | 42, 43 | 107 |
| 1 | 1 | 1 | 0 | 38, 39 | 42, 43 | 108 |
| 0 | 0 | 0 | 1 | 32, 33 | 44, 45 | 109 |
| 1 | 0 | 0 | 1 | 34, 35 | 44, 45 | 110 |
| 0 | 1 | 0 | 1 | 35, 47 | 44, 45 | 111 |
| 1 | 1 | 0 | 1 | 38, 39 | 44, 45 | 112 |
| 0 | 0 | 1 | 1 | 32, 33 | 46, 47 | 113 |
| 1 | 0 | 1 | 1 | 34, 35 | 46, 47 | 114 |
| 0 | 1 | 1 | 1 | 36, 37 | 46, 47 | 115 |
| 1 | 1 | 1 | 1 | 38, 39 | 46, 47 | 116 |

At the beginning of each memory cycle, which includes sensing and reset phases, each of the addressing cores 32 through 47 is magnetically saturated in a positive direction due to the reset phase of the preceding memory cycle.

If it is now desired to sense the binary information stored by the first ferroelectric memory element 101, as may be noted from the above table, the binary address 0000 is inserted into the address register 10. To represent the binary address 0000 each of the "one" outputs of the address register 10 is at ground potential and each of the "zero" outputs of the address register 10 at −E volts. Now, with the occurrence of the first timing pulse $\phi_1$, each of the address control circuits generates a positive going pulse as is described in detail in reference to FIG. 5. These positive going voltage pulses, which typically may be in the order of 10 volts in amplitude, when applied to each of the first and second column-half-read windings 64 and 66, are together of sufficient amplitude to establish a flux that drives the first pair of column addressing cores 32 and 33 from a condition of positive to a condition of negative magnetic saturation. Recall that the cores are driven toward positive saturation P if current is flowing in the core winding such that the dot end is positive going with respect to the non-dot end. Here, since the pulses are being applied to the windings, such that the non-dot end is positive going with respect to the dot end, the first pair of cores 32 and 33 are each driven to negative magnetic saturation. If the memory is in the destructive sensing mode of operation, as each of the first pair of cores 32 and 33 switches from positive to negative saturation, the resulting flux change (with a dot convention adopted) generates a negative going column sensing pulse 124 (FIG. 4) having an amplitude one half that of the polarizing voltage V that is required to reverse the direction of polarization. Each one of the first pair of cores 32 and 33 contributes a voltage pulse having an amplitude one quarter that of the polarizing voltage V, namely V/4. Since the drive windings for each of the first pair of cores 32 and 33 are wound and connected in series aiding relation, the half amplitude column drive pulse 124 results.

No flux is established in either of the second or third pairs of column-addressing cores 34 and 35 or 36 and 37, respectively, since the flux established by the first and second column-half-read windings 64 and 66, respectively, in these cores is opposing. The flux in these cores, therefore, cancels and no voltage is induced in any of the drive windings 68 for the second or third pairs of addressing cores. Nor is an output pulse generated from the fourth pair of column-addressing cores 38 and 39. With the direction of the half-read windings on the fourth pair of column addressing cores, as denoted by the dot convention, the positive pulses from the row address current control circuits 12 and 14, tends to drive each of the fourth pair of column addressing cores 38 and 39 toward a condition of positive saturation. Since each of the fourth pair of cores 38 and 39 was previously in a condition of positive saturation at the beginning of the memory cycle, the resulting flux change therein is negligible. The result is that little or no output pulse is produced along the common electrode driven by the fourth pair of row addressing cores 38 and 39.

The same analysis may be made with regard to each of the pairs of the row addressing cores 40—41, 42—43, 44—45, 46—47, inclusive. The result is that the first pair of row addressing cores 40, is selected and provides a positive going row drive pulse illustrated by the waveform 126 (FIG. 4). The row and column sensing pulses 126 and 124, respectively, together create a positive switching voltage +V across the selected memory element 101 which senses the stored information destructively as described in the said Crownover et al. application.

The negative going second timing pulse $\phi_2$ passes current through the reset windings 62 of the first cores 32, 34, 36 and 38 of each of the pairs of column addressing cores to initiate the reset phase of the memory cycle. This current drives each of these first column addressing cores 32, 34, 36 and 38 in a direction of positive saturation. Because the sensing mode control circuit 77 is in the destructive sensing mode, the second timing pulse $\phi_2$ also passes through this sensing mode control circuit 77 to the disabling winding 69 of the second core of each of the pairs of column addressing cores 33, 35, 37 and 39.

Since all but the first pair of column addressing cores 32, 33 are already in a state of positive saturation, only the first pair of cores 32, 33, undergoes the switching flux change necessary to induce a pulse in their respective drive windings 68.

The combined effect of the first pair of column addressing cores 32, 33, each inducing a quarter voltage pulse in their drive windings 68, is to generate a half voltage column reset pulse +½V, as represented by the waveform 136 of FIG. 4.

The functioning of the row addressing cores 40 to 47, inclusive, is quite similar to that of the column addressing cores 32 to 39, inclusive. A difference does exist because of the operation of the reset control circuit 82 which delays the application of the second timing pulse $\phi_2$, to the row reset and disabling windings 62 and 69, respectively, in the event that a binary "zero" is sensed in the selected memory element 101 during the sensing phase. Thus, the reset control circuit 82 allows the second timing pulse $\phi_2$ to pass directly to the reset winding 62 of each of the first addressing row cores 40, 42, 44 and 46, and through the sensing mode control circuit 77 to the disabling winding 69 of each of the second row addressing cores 41, 43, 45 and 47, respectively. The third timing pulse is blocked. This second timing pulse $\phi_2$ drives each of the pairs of row cores in the direction of negative magnetic saturation. Since each of the pairs of addressing cores associated with the nonselected common electrodes are already in a condition of positive saturation due to the previous reset phase, only the first pair of row addressing cores 40, 41, provides an output row reset pulse that is equal in amplitude, but opposite in polarity to the column reset pulse 136. This row reset pulse is illustrated in FIG. 4 by the waveform 134.

If, on the other hand, a binary "zero" (illustrated by the waveform 286 of FIG. 4) is sensed by the reset control circuit 82 while operating in the destructive sensing mode, the reset control circuit blocks the second timing pulse $\phi_2$ but allows the third timing pulse $\phi_3$ to pass through each of the row reset windings 62 and through the sensing mode control circuit 77 to each of the row disabling windings 69. The third timing pulse $\phi_3$, acting through the row reset windings 62 and the row disabling windings 69, switches the first pair of row addressing cores back to a condition of positive magnetic saturation, thereby generating a delayed row reset pulse, illustrated by the waveform 138 (FIG. 4). The delayed row reset pulse 138 is equal in amplitude but opposite in polarity to the column reset pulse 136 and is displaced in time therefrom. By this technique, as was described in the said Crownover et al. application in more detail, the binary "zero" is retained in the selected first ferroelectric memory element 101. At the same time, the ferroelectric condenser elements 102, 103, 104, 105, 109 and 113, which lie along the selected common row and column electrodes 120 and 122, respectively, are each pulsed by an equal amplitude but opposite polarity pulse such that they are regenerated. This reduces the cumulative effect of the fractional disturbing pulses.

The variable impedance 72, as well as the sampling impedance which is included in the read gate and sampling impedance 80, may be adjusted to balance the signals that are applied to the selected common row and column electrodes. Further, either of these impedances may be utilized as a sampling impedance to detect the current changes that occur in the selected ferroelectric memory element during the sensing period.

When operating in the non-destructive sensing mode, the sensing mode control circuit 77 passes a steady state negative signal to the disabling windings 69 of the second core of each of the pairs of row and column addressing cores. This negative steady state signal is of sufficient amplitude to maintain each of the second cores 33 through 47 (add numbers only) positively saturated and thus insensitive to the application of switching voltages through the half-read windings 64 and 66. In this manner, only the first core of each of the pairs of row and column addressing cores 32 through 46 (even numbers only) are capable of being switched. The result is that the row and column sensing and reset pulses have an amplitude that is only one half that of the row and column sensing and reset pulses that exist during the destructive sensing mode of operation.

Thus, during each memory cycle the three timing pulses, $\phi_1$ through $\phi_3$, inclusive, initiate the quarter amplitude sensing and reset waveforms 127, 129, 135, 137 (135') as described above and illustrated in FIG. 4 for the nondestructive readout mode. Depending upon whether a binary "one" or a binary "zero" is stored in the selected memory element, the signal derived from the memory is either larger or smaller in amplitude to represent respectively a sensed binary "one" or binary "zero," as illustrated by the respective waveforms 281 and 291 (FIG. 4).

Having thus described the operation of the system of FIG. 1, the several circuits that may be employed therein will now be described. In FIG. 5 there is illustrated a schematic diagram of a suitable circuit that may be employed for the read gate and sampling impedance 80. The read gate and sampling impedance 80 includes a zero cancel 250 which is similar to each of the row and column addressing cores 32 through 46. The zero cancel core 250 includes a zero cancel winding 252 having one terminal coupled to receive the first timing pulse $\phi_1$ from the timing pulse generator 20 (FIG. 1) and the remaining terminal coupled to ground. The zero cancel core 250 also includes a reset winding 254 having one terminal coupled to the reset control circuit 82 (FIG. 1) and the remaining terminal coupled to ground. A final drive winding 256 is also wound on the zero cancel core 250 and has one terminal coupled through the cathode of a diode 258 to ground and the remaining terminal coupled through a compensating capacitor 260 to he common point 71 (FIG. 1) and a sampling impedance circuit 262 which is illustrated as included within the dotted rectangle. A variable resistor 259 is connected between ground and a common point between the output terminal of the output winding 256 and the compensating capacitor 260 to provide a means of adjusting the amplitude of the output pulses generated by the zero cancel core 250.

The sampling impedance 262 includes a pair of parallel connected legs, each of which includes a diode 264 and a variable resistor 266 connected in parallel between the common point 71 (FIG. 1) and ground. Each of the diodes 264 is connected to conduct in an opposite direction with respect to the common point 71 (FIG. 1) such that the left hand leg passes only positive going pulses and the right hand leg passes only negative going pulses to ground. The output from the sampling impedance circuit 262 is taken from a common point 268 midway between the diode and variable resistor in the right hand leg of the sampling impedance 262.

The output from this common point 268 is applied to the input of a transistor amplifier 269. The first stage of the transistor amplifier 269 includes a first PNP transistor amplifier 270. The emitter electrode of the first transistor amplifier 270 is coupled to a variable bias source 272 by which the first stage may be made to respond only to negative going signals having an amplitude in excess of a predetermined negative going amplitude. The output from the first transistor amplifier 270 is coupled to a second PNP transistor amplifier 274, the output of which is coupled to the input of an emitter follower transistor amplifier 276. The emitter follower provides a negative going output pulse, illustrated by the waveform 284. This output pulse varies with the supply voltages employed in this circuit between a quiescent condition of zero volts, or ground, and —E volts, thereby corresponding with the illustrative logic voltages employed in this system where —E volts=binary "one" and 0 volts=binary "zero." The output from the emitter follower transistor amplifier 276 is coupled to the reset control circuit 82 (FIG. 1).

The operation of the read gate and sampling impedance 80 is described in conjunction with the waveforms illustrated in FIG. 4. If a binary digit "one" is stored in the selected first memory element 101 as assumed previously, with the occurrence of the first timing pulse $\phi_1$ during a destructive read out operation, the current flowing through the first memory element 101 develops a voltage across the sampling impedance 262. This voltage, representing a stored binary "one" is illustrated by the waveform 280 (FIG. 4) as a negative going pulse. It will be noted that this output pulse has a rather sharp leading edge and is relatively long in time duration. As is known, in ferroelectric memory devices this relatively sharp leading edge in the waveform 280 is caused by the combined capacitance of the selected memory element and that of those memory elements lying along the selected common row and column electrodes. In this instance, each of the memory elements 102 to 104, inclusive, lies along the selected common row electrode 120. Since this sharp leading edge appears during the sensing of the ferroelectric memory, regardles of whether the sensing element contains a binary "zero" or a binary "one," some means of discriminating against the leading edge must be employed. Several known techniques are suitable to achieve the desired discrimination. One such technique employs a strobe gate which is gated at some point in time after the initial large signal, due to the capacitance of the several ferroelectric elements, has died down. Such gate is quite satisfactory for operation with this invention.

The circuit of FIG. 5 illustrates an alternative circuit that is suitable for discriminating against this sharp leading edge by use of a zero cancel signal that is equal but opposite in polarity to the sharp pulse that results from this capacitive effect in the memory.

Thus, in FIG. 5, with the occurrence of the first timing pulse $\phi_1$, the zero cancel winding 252 establishes a flux in the zero cancel core 250 such as to induce a positive going pulse in the drive winding 256. This positive going pulse may be adjusted in amplitude by the variable impedance 259, after which it is passed through the compensating capacitor 260 which has a value (N−1) C where C represents the saturated capacitance of each of the ferroelectric memory elements lying along the selected common row electrode 120, and N the total number of such elements in the row. The purpose of the compensating capacitor 260 is to shape this pulse, generated in the drive winding 266, to be substantially identical in shape, amplitude, and time duration as the spike or sharp leading edge of the signal 281 derived from the memory during destructive sensing. Thus, the zero cancel pulse 282, being equal in amplitude but opposite in polarity to the memory output signal 280, cancels the leading edge of this latter signal to develop an output signal across the right sampling resistor 266 in the right hand leg of the sampling impedance 262 illustrated by the waveform 204. This output signal 204 is amplified and clipped by the amplifier 269 to pass a negative going output pulse illustrated by the waveform 282, which varies between ground and −E volts, to the reset control circuit 82. It will be recalled, that with the logic voltage levels employed, the negative going output signal 284 from the read gate represents binary "one."

During the second timing pulse $\phi_2$, which is the reset phase of the memory cycle, an extraneous positive going output signal, illustrated by the waveform 286 (FIG. 4), is developed across the sampling impedance 262. This extraneous output signal is the result of the large current which flows through the selected memory element 101 as it is switched from positive remanent polarization to negative remanent polarization during reset. Being positive going, this extraneous signal 286 is shunted by the left hand leg of the sampling impedance 262 to ground and provides no input to the amplifier 269 in the read gate and sampling impedance 80. Also, during the second timing pulse $\phi_2$, the reset winding 254 of the zero cancel core 250 returns the core to its quiescent state of positive saturation. As the zero cancel core 250 is switched from negative saturation to positive saturation, an output pulse tends to be generated in the drive winding 256, but is blocked by the action of the diode 258 which allows only positive going pulses to pass to the sensing impedance 62. Thus, it is apparent that during the reset phase of the memory cycle, no extraneous pulses are allowed to pass through the read gate and sampling impedance 80 to the reset circuit 82.

If, instead of storing the binary "one," the first memory element 101 is storing a binary "zero," during destructive sensing initiated by the first timing pulse $\phi_1$ a binary "zero" signal, illustrated by the waveform 290 (FIG. 4), develops across the sampling impedance 262. As mentioned above, this binary "zero" signal 290 appears simultaneously, with the equal amplitude but opposite polarity to the zero cancel pulse 282. The zero cancel pulse 282 tends to cancel out, most, if not all, of the binary "zero" pulses 290, leaving only a small amount of disturbance at the input to the amplifier portion of the read gate and sampling impedance 80, as is illustrated by the waveform 206 of FIG. 4. This small disturbance is easily eliminated by adjusting the bias on the first transistor amplifier 270, by the bias control 272, such that the first transistor amplifier 270 does not conduct unless the negative going memory output signal exceeds a predetermined minimum value. Thus, by suitable adjustment of the bias control 272, the read gate and sampling impedance 80 provides no output to the reset control circuit in the event that the sensed memory element 101 contains a binary "zero," and a negative going −E volt pulse 284 in the event that the sensed memory element contains a binary "one."

During the reset portion of the destructive read out memory cycle extraneous positive going output signals 293 resulting from the half amplitude column and row reset pulses 136 and 138, respectively, occur. As described above, any positive going signals from the memory are shunted to ground by the left hand leg of the sampling impedance 262 so as to not interfere with the operation of the read amplifier 269.

During the non-destructive read out of the memory, the operation of the sampling impedance and read gate 80 is essentially the same as occurs during destructive read out. The primary difference is that the signals derived from the memory are reduced in amplitude. Thus, if a binary digit "one" is stored in the selected element during sensing by the quarter amplitude or less row and column drive pulses 127 and 129, respectively, the signal from the memory developed by the sampling impedance 262 is smaller in amplitude as illustrated by the waveform 281. Similarly, the extraneous signal occurring during reset in the event a binary "one" is stored is illustrated by the waveform 287. The binary "one" signal 281, it will be noted, also contains a relatively sharp leading edge which is cancelled by the zero cancel signal 282 to provide an input binary "one" signal to the amplifier 299, as illustrated by the waveform 296. Note that the input binary "one" signal 296 is essentially the same shape but smaller in amplitude than the binary "one" input signal 204 which occurs during destructive read out.

If, on the other hand, a binary "zero" is stored in the selected memory element, during non-destructive read out the signal from the memory is simply a negative going signal, illustrated by the spike shaped waveform 291, which is cancelled by the zero cancel signal 282 with the result that only a relatively small disturbance illustrated by the waveform 206′ passes to the read gate amplifier 269. Likewise, the extraneous positive going signals due to the sequential reset pulses 135′ and 137 are illustrated by the positive going spike shaped signals 295. These positive going signals 295 are shunted to ground by the left hand leg 265 of the sampling impedance 262 as previously explained.

In FIG. 6 there is illustrated a schematic diagram of a suitable circuit that may be employed for the address current control circuits 12 through 18. Referring now to FIG. 6, the single, flip-flop in the address register 10 that controls the first address control circuit 12 is illustrated. This flip-flop is a conventional bistable circuit such as that described in an application entitled "Digital Converter," S. N. 771,350 filed November 3, 1958 by Bevitt J. Norris et al. and assigned to Daystrom Incorporated. The Norris application describes a typical transistor flip-flop which has a set and a reset input and corresponding "one" and "zero" outputs. To conform with the logic voltages employed in this illustrative system, when the flip-flop is set, its one output is high as represented by a −E volt signal level, whereas its complementary "zero" output is low as represented by a ground or zero voltage level. Conversely, if the flip-flop is reset, its "zero" output is high at —E volts whereas its "one" output is low at ground or zero voltage level. The "one" output of the address register flip-flop 10 is connected to one input of first "and" gate 150. The second input to the first "and" gate 150 is derived from the first timing pulse $\phi_1$ from the timing pulse generator 20 of FIG. 1. For use with this circuit, the timing pulse available from the timing pulse generator quiescently is at ground potential and with the occurrence of each timing pulse, a —E volt is generated. The inputs to the first "and" gate 150 are connected through first and second diodes 152 and 154 to a common point 156. The common point 156, from which the output of the first "and" gate 150 is taken, is connected through a resistor 158 to a source of negative potential having a value of —E volts. A second "and" gate 160, essentially identical to the first "and" gate 150, receives one of its inputs from the zero output of the address flip-flop 10.

The output of the first "and" gate 150 (common point 156) is capacitively coupled through a transistor inverter stage 162 the output of which is capacitively coupled to the input of a transistor amplifier 164. In similar manner, the output of the second "and" gate 160 is capacitively coupled to the input of a second transistor amplifier 166. Note that each of the transistor amplifiers utilizes opposite conductivity transistors in order to provide opposite polarity pulses as will be more fully described. The outputs of each of the transistor amplifiers 164 and 166 are coupled through diodes 168 and 170, respectively, to a common output lead thence through a variable resistor 24 to the half-read windings of the addressing cores (FIG. 1). The operation of the address current control circuit is such that if the address input is a binary "one" a negative output pulse is provided. Conversely, if the binary input from the address flip-flop is "zero," the output pulse developed is a positive going pulse.

If, for example, the address flip-flop contains a binary "one," the voltage level applied to the second diode 154 in the first "and" gate 150 is —E volts with respect to ground. Under these conditions, even with the second diode 154 primed and non-conducting, the common point 156 remains clamped at ground potential due to conduction in the first diode 152. It will be recalled that the first diode 152 is returned to a potential source (the timing pulse generator) having a quiescent voltage level of ground. However, with the occurrence of the first timing pulse $\phi_1$, the input of the first diode 152 drops to —E volts. With both diodes cut off, the voltage at the common point 156 drops to —E volts, that of the supply voltage for the "and" gate, for the duration of the first timing pulse $\phi_1$. This produces a negative going output pulse as illustrated by the waveform 172. This negative going output pulse 172 is differentiated and applied to the inverter 162 which passes a narrow positive going pulse to the input of the second transistor amplifier 164. This positive going inverted pulse corresponds in time to the leading edge of the output pulse 172 from the first "and" gate 150. The second transistor amplifier 164 amplifies this inverted pulse to produce a negative going pulse, with the circuit parameters illustrated, that varies between +E volts and —E volts. This negative pulse illustrated by the waveform 176 passes through the diode 168 to one of the half-read windings of FIG. 1.

The second "and" gate 160 produces no output pulse since its input from the flip-flop "zero" output remains at ground potential. If the address contained in the address flip-flop 10 had been binary "zero," of course, the reverse would have occurred such that with the occurrence of the first timing pulse $\phi_1$, the second "and" gate 160 passes a negative output pulse, which, when differentiated and amplified by the amplifier 166, produces a positive going output pulse 178 as illustrated. This postive pulse 178 is coupled to one of the half-read windings of the addressing cores (FIG. 1).

Figure 7:
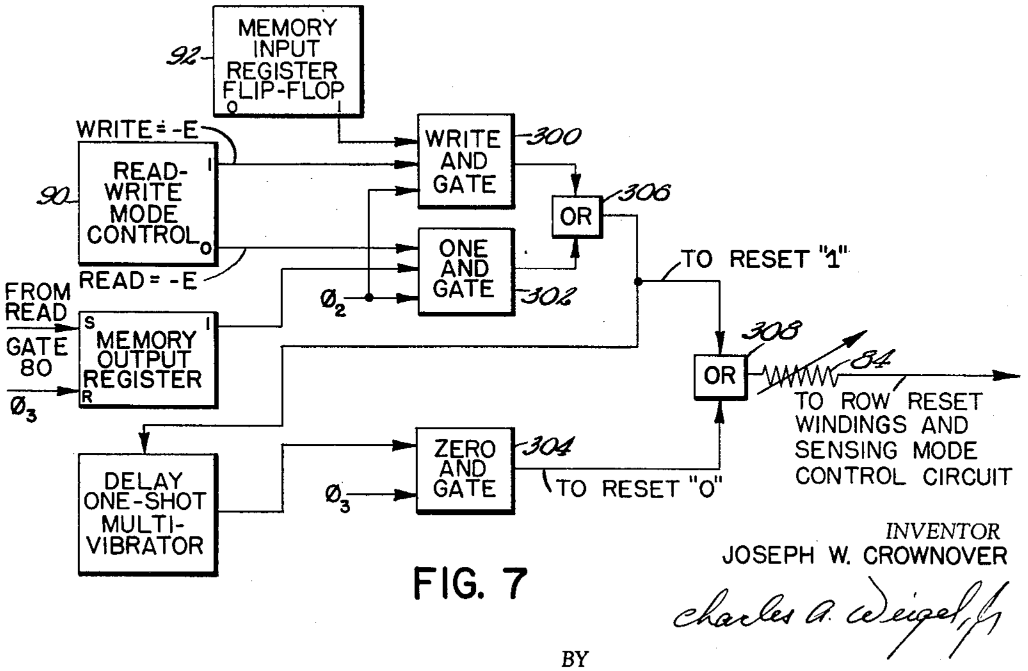
FIGURE 7 is a block diagram of a suitable reset control circuit which may be utilized in the system of FIGURE 1.

The details of suitable logic circuitry that may be used for the reset control circuit 82 (FIG. 1) are set forth in block diagram form in FIG. 7. Basically, the reset control circuit 82 includes a write "and" gate 300, a one "and" gate 302, and a zero "and" gate 304. The write "and" gate 300 is a three input coincidence gate receiving input from the memory-input-register flip-flop 92 (FIG. 1), the second timing pulse $\phi_2$, and from the "one" output of the read-write mode control flip-flop 90 (FIG. 1). In a similar manner, the one "and" gate 302 is a three input coincidence gate receiving inputs from the "zero" output of the read-write mode-control flip-flop 92 (FIG. 1), the memory output register 303 and the second timing pulse $\phi_2$. The memory output register includes a flip-flop whose "one" output is coupled to the input of the one "and" gate 302. The output of the read gate 80 is coupled to the set input of the flip-flop and the third timing pulse provides the reset input. The output of each of the write and one "and" gates 300 and 302, respectively, are coupled to an "or" circuit 306.

The "or" circuit 306 is a conventional logic circuit capable of providing an output negative going E volt pulse varying between ground and —E volts in the presence of an input negative going E volt signal on either of its two inputs from the "and" gates 300 or 302, respectively. The output of the "or" circuit 306 is coupled to provide a "reset to one" input to a second "or" circuit 308 and to the input of a delay-one-shot multivibrator 310. The delay-one-shot multivibrator 310 may be conventional providing an output pulse that is quiescently at —10 volts which rises to ground potential when triggered by a pulse from the first "or" circuit 306. Once triggered, the one-shot multivibrator 310 output remains at ground potential for the period of time between the second and third timing pulses $\phi_2$ and $\phi_3$, respectively. This period of time is sufficient to overlap the occurrence of the third timing pulse $\phi_3$. The output of the delay-one-shot multivibrator 310 is coupled to one of the two inputs of the zero "and" gate 304; the remaining input for the zero "and" gate 304 is the third timing pulse $\phi_3$. In turn, the output of the zero "and" gate 304 is connected to pass the "reset to zero" signal to the second "or" circuit 308. The second "or" circuit 308, is, in turn, connected through a variable resistor 84 to each of the reset windings 62 and the sensing mode control circuit 77.

If the read-write-mode-control flip-flop 92 is in the read mode, its zero output is "high" (—E volts). Thus primed, the second timing pulse $\phi_2$ passes through the one "and" gate 302 and the first "or" gate 306 as a "reset to one" signal which in turn passes through the second "or" gate 308 to each of the row reset windings 62 (FIG. 1) and the sensing mode control circuit. This initiates the generation of fractional amplitude row-reset pulses 134 or 135 (FIG. 4) along the selected row common electrode simultaneously with the column reset pulse 136 or 137 (FIG. 4) during the second timing pulse $\phi_2$. As previously described, these simultaneous reset pulses reset the selected memory element to store a binary "one."

The "reset to one" signal from the first "or" gate 306 also is applied through the delay-one-shot multivibrator 310 to remove the "high" priming level from the zero "and" gate 304. Thus, the third timing pulse $\phi_3$ is blocked and no output pulse is provided.

This read-write-mode-control flip-flop 90 controls the writing of new information into the memory during each memory cycle. Thus, if the read-write-mode-control flip-flop 92 is placed in the write mode wherein its one output is high, and its complementary zero output is low, either a "one" or a "zero" is reset into the ferroelectric memory during either the second or third timing pulse $\phi_2$ or $\phi_3$, depending upon the condition of the memory input register flip-flop 92.

For example, if the memory-input-register flip-flop 92 stores a binary "one," its one output is high, such that the write "and" gate 300 is primed both by the read-write-mode-control flip-flop 92 and the memory input register flip-flop 92. Thus, with the occurrence of the second timing pulse $\phi_2$, the write "and" gate 300 passes a negative going signal which in turn passes through the first "or" gate 306 to generate a "reset to one" signal which functions in the same manner as if the signal had been received in the one "and" gate 302 as described above.

If, on the other hand, a memory input register flip-flop 92 had contained a binary "zero," its "one" output would be low such that the write "and" gate 300 is not primed and accordingly does not generate any output signal with the occurrence of the second timing pulse $\phi_2$. Under these conditions the delay-one-shot multivibrator 310 is unable to inhibit the zero "and" gate 304 and as a consequence, upon the occurrence of the third timing pulse $\phi_3$, the zero "and" gate 304 passes a "reset to zero" signal through the second "or" gate 308. The "reset to zero" signal, occurring during the third timing pulse $\phi_3$, generates sequential reset pulses 138 or 135, and the selected memory element remains in its binary "zero" polarized condition. It will be recalled that the selected memory element was driven to binary "zero" during each sensing phase of the memory cycle. The variable resistor 84 is employed to adjust the amplitude of the reset pulses.

Figure 8:
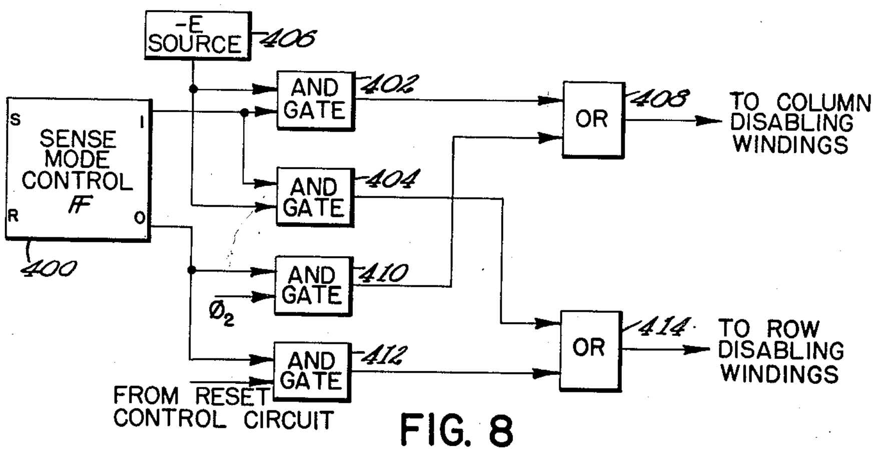
FIGURE 8 is a block diagram of a sensing mode control circuit that may be utilized in the system of FIGURE 1.

In FIG. 8 there are illustrated the details of the sensing mode control circuit 77. The circuit includes a sense-mode-control flip-flop 400 which may be controlled by the computing system of which the ferroelectric memory of FIG. 1 may be a part. Thus, if the computing system places the sense-mode-control flip-flop 400 in a set condition such that its "one" output is high, the system is made to operate in the non-destructive sensing mode. Conversely, if the sense-mode-control flip-flop 400 is reset such that its "zero" output is high, the system is made to operate in the destructive sensing mode. The destructive mode of operation is required to write new information into the memory. The "one" output of the sense-mode-control flip-flop 400 is coupled to one input of each of first and second "and" gates 402 and 404, respectively. The remaining input to each of these "and" gates 402 and 404 is provided by a steady voltage source 406 which maintains a continuous priming voltage level of $-E$ volts at the inputs of each of these "and" gates. The output of the first "and" gate 402 is then connected to an "or" circuit 408 and thence to the column disabling windings 69 (FIG. 1).

In like manner, the "zero" output of the sense-mode-control flip-flop 400 is connected to one input of each of a third and fourth "and" gates 410 and 412, respectively. The third "and" gate 410 receives a second input from the second timing pulse $\phi_2$ of the timing pulse generator 20 (FIG. 1). The output of the third "and" gate 410 is connected through the "or" gate 408 to the column disabling winding 69 (FIG. 1).

The fourth "and" gate 412 receives its second input from the reset control circuit 82 (FIG. 1). The outputs of each of the second and fourth "and" gates 404 and 412, respectively, are each connected through an "or" circuit 414 to the row disabling windings 69 (FIG. 1).

When employed in the system of FIG. 1, if the "one" output of the sense-mode-control flip-flop 400 is high whereby the non-destructive mode of operation is selected for the system; both the first and second "and" gates 402 and 404 are primed. Thus primed, the negative disabling voltage level $-E$ from the source 406 passes through each of the "or" gates 408 and 414 to the row and column disabling windings 69 of FIG. 1. In this manner, the second core of each of the row and column addressing cores 33 to 47 (odd numbers only) inclusive, is maintained in a condition of negative saturation. The negative voltage applied through "or" gates 408 and 414 is sufficient to maintain these cores disabled regardless of the application of switching pulses to the half-read windings 64 and 66.

Conversely, if the sense-mode-control flip-flop 400 is reset such that its "zero" output is high to select the destructive mode of operation, the negative disabling voltage from the source 406 is blocked by the first and second "and" gates 402 and 404 due to the complementary low level signal from its "one" output. With the zero output high, each of the third and fourth "and" gates 410 and 412, respectively, are primed. Thus primed, with the occurrence of the second timing pulse $\phi_2$ the third "and" gate 410 passes a negative reset pulse through the first "or" gate 408 to the column disabling windings 69. Simultaneously, or sequentially, depending upon the condition of the selected ferroelectric memory element (FIG. 1) during the sensing cycle, the reset control circuit 82 (FIG. 1) passes either the second or third timing pulse $\phi_2$ or $\phi_3$, respectively, through the fourth "and" gate 412 and the second "or" gate 414 to the row disabling windings 69 (FIG. 1). In this manner, both cores of each pair of row-addressing cores 40 to 47, inclusive (FIG. 1) are allowed to operate simultaneously or sequentially depending upon the input received from the reset control circuit which may be either the second or third timing pulse $\phi_2$ or $\phi_3$, respectively.

It should be apparent to those skilled in the art that although this system and method of this invention have been described with reference to a sixteen element matrix, simply by applying the teachings of this invention, much larger matrices could be constructed. For example, the number of row or column addressing cores could be increased by two's merely by the addition of additional address current control circuits and a corresponding additional number of flip-flops in the address register 10 of FIG. 1. Also, although the core drive system described is believed to be particularly advantageous, other well known coincident type memory drive techniques may be employed, as desired, to obtain the non-destructive sensing of this invention.

There has thus been described a novel method and system for using a ferroelectric material having a differential capacitance as a memory element which can be sensed, or read out, without destroying the information stored therein. The memory element is sensed by applying a sensing voltage having insufficient amplitude to change its polarization across the element. By detecting the current that flows through said memory element during the application of the sensing voltage, the polarization of the element is determined. The invention results in an inexpensive, and simpler system than those of the prior art. By applying the concepts of this invention, the useful life of the ferroelectric material employed will be extended. Also, due to the regenerative memory cycle employed, the cumulative effect of fractional pulses upon the non-selected memory elements which lie along the selected row and column electrodes is reduced and the memory has a higher degree of reliability.

In addition, the system of this invention provides a low impedance path for each and every row and column common electrode that is not selected during a particular memory cycle. By this technique, all of the ferroelectric memory elements comprising the memory are isolated from the selected row and column electrodes by a low impedance path to ground. By using this system and method of this invention, both a wider range and often less expensive ferroelectric material may be used.

Since many changes could be made in the specific combinations of apparatus disclosed herein and many apparently differing embodiments of this invention could be made without departing from the scope thereof, it is intended that all matter contained in the foregoing description or shown in the accompanying drawings shall be interpreted as being illustrative and not in a limiting sense.

What is claimed is:

1. A method for non-destructively sensing binary information stored in a capacitor having a dielectric of a ferroelectric material that has a differential capacitance characteristic and is polarized in one direction or the other in accordance with said binary information comprising the steps of: applying a predetermined polarity sensing voltage signal across said capacitor, having insufficient energy to reverse the direction of polarization of said material, detecting the amplitude of current that flows through said capacitor during the application of said sensing signal whereby a larger current flows through said capacitor in the event its dielectric is polarized in a direction opposite said predetermined direction to enable sensing and yet said capacitor dielectric remains polarized in its original direction of polarization and simultaneously applying reset pulses having a polarity opposite that of said sensing pulses but having substantially the same energy as said sensing pulses to said capacitor in the event the amplitude of said current flow during said sensing signal exceeds a predetermined minimum amplitude.

2. A method for non-destructively sensing binary information stored in a capacitor having a dielectric of a ferroelectric material that has a differential capacitance characteristic and which is polarized in one direction or the other in accordance with said binary information, comprising the steps of: applying a predetermined polarity pulse across said capacitor having an insufficient ampiltude to reverse the direction of polarization of said material, detecting the amplitude of current that flows through said capacitor during the application of said pulse whereby said capacitor is sensed and yet remains substantially polarized in its original direction of polarization, and subsequently applying a reset pulse having a polarity opposite said predetermined polarity and the same amplitude as said first named pulse across said capacitor.

3. A method for non-destructively sensing binary information stored in a coincident voltage type ferroelectric memory matrix having common row and column electrodes and a plurality of condensers connected at the intersection of each of said row and column electrodes, each having a dielectric of a ferroelectric material having a differential capacitance characteristic and which dielectric is polarized in one direction or the other in accordance with said binary information comprising the steps of: simultaneously applying opposite polarity sensing pulses to one of said row and one of said column electrodes, said sensing pulses having a combined amplitude insufficient to reverse the direction of polarization of the selected condenser dielectric, and detecting the amplitude of current that flows through said condenser during the application of said sensing pulses.

4. The method set forth in claim 3 including the additional step of simultaneously applying reset pulses having a polarity opposite that of said sensing pulses but having substantially the same amplitude as said sensing pulses to said one row and to said one column electrode in the event the amplitude of said current flow exceed a predetermined minimum amplitude.

5. The method set forth in claim 3 including the additional step of sequentially applying reset pulses having a polarity opposite that of said sensing pulses but having substantially the same amplitude as said sensing pulses to said one row and to said one column electrode in the event the amplitude of said current flow is less than a predetermined minimum amplitude.

6. A method for non-destructively sensing binary information stored in a coincident voltage type ferroelectric memory matrix having common row and column electrodes and plurality of memory elements connected at the intersections of each of said row and column electrodes, each having a dielectric having a non-rectangular hysteresis characteristic and which is polarized in one direction or the other in accordance with said binary information comprising the steps of: simultaneously applying opposite polarity sensing pulses to one of said row and one of said column electrodes, said sensing pulses having a combined amplitude insufficient to reverse the direction of polarization of the selected memory element, and detecting the amplitude of current that flows through said memory element during the application of said sensing pulses.

7. A method for non-destructively operating a coincident voltage type ferroelectric memory matrix having common rom and column electrodes and a plurality of condensers connected at the intersections of each of said row and column electrodes each having a dielectrode of a ferroelectric material of differential capacitance characteristic and which is polarized in one direction or the other in accordance with said binary information comprising the steps of: non-destructively sensing a selected one of said condensers by simultaneously applying a sensing pulse of one polarity to one of said row electrodes and a sensing pulse of polarity opposite said one polarity to one of said column electrodes, the absolute sum of said sensing pulses being insufficient to reverse the direction of polarization of said selected condenser dielectric, and resetting said selected condenser by always applying a reset pulse of said opposite polarity to said one electrode and a reset pulse of said one polarity to said column electrode.

8. In a data storage system including a ferroelectric memory element, said ferroelectric memory element capable of assuming two stable states of polarization representative of binary information and having a differential capacitance, the combination of means to apply a polarizing voltage across said memory element in one direction or the other in accordance with said data to be stored and of sufficient energy to polarize said memory element, means to apply a sensing pulse across said memory element having a predetermined polarity and an energy that is insufficient to change the state of polarization of said memory element, detecting means for detecting when the current flow through said memory element during the application of said sensing pulse exceeds a predetermined minimum value and means for generating a reset pulse having a polarity opposite to the predetermined polarity and an energy content that is insufficient to change the state of polarization of the dielectric, and means to apply said reset pulse to said condenser subsequent to said sensing pulse.

9. The data storage system set forth in claim 8 wherein each of said sensing means and said reset means includes a relatively constant impedance means whereby due to said differential capacitance said sensing and reset pulses tend to maintain said memory element polarized in its existing state of polarization and the reliability of said data storage system is improved.

10. In a data storage system including a condenser having a dielectric of a ferroelectric material having a hysteresis characteristic of polarization versus applied voltage with a differential slope on either side of the points of zero applied voltage, and means to apply a polarizing voltage signal across said condenser in one direction or the other in accordance with said data to be stored thereby to polarize said condenser dielectric in a direction in accordance with said data, the combination of means to apply a sensing voltage signal having a predetermined polarity and an amplitude less than that required to change the direction of polarization of said condenser dielectric, detecting means for detecting when the current flow through said condenser during the application of said sensing voltage signal exceeds a predetermined minimum, said current flow exceeding said predetermined minimum when said condenser is polarized in said one direction whereby said condenser is non-destructively sensed and means sequentially to apply a reset voltage signal having a polarity opposite said predetermined polarity and an amplitude less than that required to change the direction of polarization of said condenser dielectric whereby said condenser dielectric is maintained polarized in its existing direction of polarization.

11. A data storage circuit comprising a plurality of condensers each having a dielectric of a ferroelectric material that has a differential capacitance characteristic, first means electrically connecting one electrode of each of said condensers in rows in one direction, second means electrically connecting the other electrode of each of said condensers in columns in another direction, and sensing means coupled to one of each of said first and second means for applying a sensing voltage signal across a selected one of said condensers in a predetermined direction, said sensing voltage signal having an amplitude that is insufficient to change the direction of polarization of said selected condenser.

12. A data storage circuit comprising a plurality of condensers each having a dielectric of a ferroelectric material that has a differential capacitance characteristic, first means electrically connecting one electrode of each of said condensers in rows in one direction, second means electrically connecting the other electrode in each of said condensers in columns in another direction, and sensing means coupled to one of each of said first and second means for applying a sensing voltage signal across a selected one of said condensers in a predetermined direction, said sensing voltage signal having an amplitude that is insufficient to change the direction of polarization of said selected condenser, and detecting means for detecting the current flow through said selected condenser during the application of said sensing voltage signal, said current flow exceeding a predetermined value when said condenser is polarized in said one direction whereby said condenser is non-destructively sensed.

13. The combination set forth in claim 12 which also includes reset means coupled to said one of each of said first and second means for applying a reset voltage signal across said selected condenser in a direction opposite said predetermined direction, but having substantially the same amplitude as said sensing voltage signal, whereby said selected condenser and the remaining condensers connected to each of said first and second means are maintained substantially fully polarized in their existing direction of polarization.

14. The combination set forth in claim 12 wherein said sensing means includes: a pair of row saturable magnetic cores and a pair of column saturable magnetic cores, each having a substantially rectangular magnetic hysteresis characteristic, each of said cores also having a drive winding, the drive windings of each of said pairs of cores being connected in series with a corresponding different one of said first and second means for establishing a flux in each of said cores of sufficient amplitude to drive each core from a first to a second state of magnetic saturation thereby to induce a voltage signal having an amplitude substantially one half the amplitude of said sensing voltage signal in each of said drive windings, and means for maintaining one core of each pair of cores in said first state of magnetic saturation thereby to have non-destructive sensing of said selected condenser.

15. The combination set forth in claim 14 which also includes row and column reset means responsive to said detecting means for sequentially applying reset voltage signals to said one first and to said one second means so as to apply fractional voltage signals across said selected condenser in a direction opposite said predetermined direction, but each having an amplitude approximately one half that of said sensing voltage signal.

16. The combination set forth in claim 15 wherein said reset means includes means for simultaneously establishing a flux in each of said cores sufficient to drive each core from said second state of magnetic saturation to said first state of magnetic saturation in response to said detecting means detecting a current flow in said selected condenser in excess of said predetermined value, and for sequentially establishing a flux first in each of said row cores and second in each of said column cores that is sufficient to drive each core from said second state of magnetic saturation to said first state of magnetic saturation in response to said detecting means detecting a current flow in said selected condenser less than said predetermined value.

17. A ferroelectric data storage system of the type including a plurality of condensers each having a dielectric of a ferroelectric material, said ferroelectric material having a hysteresis characteristic in which the slope is different on either side of the points of "zero" applied voltage, said condensers being arrayed in columns and rows, a plurality of row electrodes each of which is coupled to one plate of all of the condensers in a different one of said rows, a plurality of column electrodes each of which is coupled to all of the condensers in a different one of said columns, and sensing means for applying sensing pulses to a column electrode and to a row electrode coupled to a selected condenser, said sensing pulses having a predetermined polarity and an amplitude that is insufficient to change the direction of said polarization of said condenser.

18. The system set forth in claim 17 which also includes detecting means for detecting when the current flow through said condenser during the application of said sensing pulses exceeds a predetermined minimum value, said current flow exceeding said predetermined minimum value when said condenser is polarized in said one direction but not when said condenser is polarized in said other direction whereby said selected condenser is non-destructively sensed.

19. A data storage circuit comprising a slab of ferroelectric material that has a differential capacitance characteristic, a first plurality of conductive strips placed in parallel on one side of said slab, a second plurality of conductive strips placed in parallel on the other side of said slab of ferroelectric material in another direction, thereby to form a plurality of condensers at the spatial intersections of each of said conductive strips, sensing means coupled to one of each of said first and second plurality of conductive strips for applying a sensing voltage signal across a selected one of said condensers in a predetermined direction, said sensing voltage signal having an amplitude that is insufficient to change the direction of polarization of said selected condenser, and detecting means for detecting the current flow through said selected spatial condenser during the application of said sensing voltage signal, said current flow exceeding a predetermined value when said condenser is polarized in said one direction when said spatial condenser is polarized in said one direction whereby said spatial condenser is non-destructively sensed.

20. A storage device for non-destructive readout of binary information comprising a capacitor having a dielectric of ferroelectric material, means for applying alternate polarity input signals to said capacitor to partially and alternately reverse and aid the polarization of said ferroelectric material from a stable state of remanent polarization, and means for sensing output signals resulting from said partial polarization reversal, said ferroelectric material having a hysteresis characteristic of polarization versus applied voltage that exhibits a different slope on either side of the points of zero applied voltage.

21. A memory circuit comprising a ferroelectric capacitor having a polarization at one point on its hysteresis loop, means applying alternate polarity pulses to said capacitor to cause said capacitor to move away from and toward said point of polarization, and means receiving an output signal from said capacitor on application thereto of said pulse, said ferroelectric capacitor having a hysteresis characteristic of polarization versus applied voltage that exhibits a different slope on either side of the point of zero applied voltage.

22. A storage circuit comprising a ferroelectric capacitor capable of selectively assuming one or two stable states of polarization representative of binary information, means for determining the particular stable state at which said capacitor exists comprising means for applying storage pulses of one polarity to said capacitor to polarize said capacitor to said first stable state and of opposite polarity to polarize said capacitor to the second stable state and means applying a readout pulse to said capacitor in said first stable state, means receiving an output pulse from said capacitor on application thereto of said readout pulses, and means applying a reset pulse of opposite polarity to said readout pulse to said capacitor in said intermediate state sufficient to polarize said capacitor to a point intermediate to said stable states to restore said capacitor to said first stable state, said capacitor having a dielectric of ferroelectric material having a hysteresis characteristic in which the slope is different on either side of the points of zero applied voltage.

23. In a capacitor having a dielectric of a ferroelectric material that has a differential capacitance characteristic and initially is at least partially polarized in one state or the other, the method of substantially fully polarizing said capacitor to its initial state comprising the steps of: applying alternate polarity pulses across said capacitor of insufficient energy to reverse the state of polarization of its dielectric, whereby said capacitor is fully polarized in its original state of polarization.

24. In a data storage circuit including a condenser having a dielectric of a ferroelectric material capable of assuming two stable states of polarization representative of binary information and having a substantially nonrectangular hysteresis characteristic, the combination of means to apply a polarizing pulse across said condenser in one direction or the other in accordance with said data to be stored thereby to polarize the dielectric of said condenser to one or the other of said stable states, means to apply a sensing voltage across said condenser having an energy content less than the energy of said polarizing voltage and having a predetermined polarity, and detecting means for detecting the current flow through said condenser during the application of said sensing voltage, said current flow being greater when said condenser dielectric is polarized in said other state whereby said condenser is nondestructively sensed, and means for generating a reset pulse having a polarity opposite to the predetermined polarity and an energy content that is insufficient to change the state of polarization of the dielectric, and means to apply said reset pulse to said condenser subsequent to said sensing pulse.

25. A storage circuit comprising a ferroelectric capacitor capable of assuming two stable states of polarization representative of binary information, means for applying storage pulses to said capacitor to determine its particular stable state, and means for nondestructively sensing the state of said capacitor, said sensing means including means for applying partial switching pulses of alternate polarity to said capacitor, and means for observing the current flow through such capacitor during the occurrence of one of said alternate polarity pulses.

References Cited in the file of this patent

UNITED STATES PATENTS

| | | |
|---|---|---|
| 2,869,111 | Young | Jan. 13, 1959 |
| 2,955,281 | Brennemann et al. | Oct. 4, 1960 |
| 2,957,164 | Long et al. | Oct. 18, 1960 |